United States Patent
Kubo et al.

(10) Patent No.: US 12,180,085 B2
(45) Date of Patent: Dec. 31, 2024

(54) METHOD FOR PRODUCING HALIDE

(71) Applicant: Panasonic Intellectual Property Management Co., Ltd., Osaka (JP)

(72) Inventors: Takashi Kubo, Hyogo (JP); Kazufumi Miyatake, Osaka (JP); Keita Mizuno, Aichi (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 343 days.

(21) Appl. No.: 17/933,097

(22) Filed: Sep. 17, 2022

(65) Prior Publication Data

US 2023/0018638 A1    Jan. 19, 2023

Related U.S. Application Data

(63) Continuation of application No. PCT/JP2021/002516, filed on Jan. 25, 2021.

(30) Foreign Application Priority Data

Mar. 31, 2020    (JP) ................ 2020-064816

(51) Int. Cl.
   *C01F 17/36*    (2020.01)
   *H01B 1/06*    (2006.01)
   *H01M 10/0562*    (2010.01)

(52) U.S. Cl.
   CPC ............... *C01F 17/36* (2020.01); *H01B 1/06* (2013.01); *H01M 10/0562* (2013.01);
   (Continued)

(58) Field of Classification Search
   None
   See application file for complete search history.

(56) References Cited

U.S. PATENT DOCUMENTS

| | | | | |
|---|---|---|---|---|
| 5,178,664 A | * | 1/1993 | Picard | ............. C01F 17/271 423/263 |
| 2004/0016632 A1 | * | 1/2004 | Barker | ............. B01J 19/12 204/157.4 |

(Continued)

FOREIGN PATENT DOCUMENTS

| | | | | |
|---|---|---|---|---|
| EP | 2128093 A1 | * | 12/2009 | ........... B01J 23/002 |
| EP | 4 131 500 A1 | | 2/2023 | |

(Continued)

OTHER PUBLICATIONS

International Search Report of PCT application No. PCT/JP2021/002516 dated Mar. 30, 2021.

(Continued)

*Primary Examiner* — Daniel Berns
*Assistant Examiner* — Zachary John Baum
(74) *Attorney, Agent, or Firm* — Greenblum & Bernstein, P.L.C.

(57) ABSTRACT

The production method of the present disclosure includes heat-treating a material mixture containing a compound containing Y, a compound containing Sm, $NH_4\alpha$, $Li\beta$, and $Ca\gamma_2$ in an inert gas atmosphere. The compound containing Y is at least one selected from the group consisting of $Y_2O_3$ and $Y\delta_3$, and the compound containing Sm is at least one selected from the group consisting of $Sm_2O_3$ and $Sm\varepsilon_3$. The material mixture contains at least one selected from the group consisting of $Y_2O_3$ and $Sm_2O_3$, and $\alpha$, $\beta$, $\gamma$, $\delta$, and $\varepsilon$ are each independently at least one selected from the group consisting of F, Cl, Br, and I.

12 Claims, 4 Drawing Sheets

(52) U.S. Cl.
CPC ...... *C01P 2002/50* (2013.01); *C01P 2006/40* (2013.01); *H01M 2300/008* (2013.01)

(56) References Cited

U.S. PATENT DOCUMENTS

| | | | |
|---|---|---|---|
| 2009/0050918 A1* | 2/2009 | Zhuang | C09K 11/77744 252/301.4 F |
| 2018/0183046 A1* | 6/2018 | Jin | H01M 4/1315 |
| 2019/0088995 A1 | 3/2019 | Asano et al. | |
| 2020/0212481 A1 | 7/2020 | Nagamine et al. | |
| 2020/0328461 A1 | 10/2020 | Asano et al. | |

FOREIGN PATENT DOCUMENTS

| | | |
|---|---|---|
| EP | 4 131 506 A1 | 2/2023 |
| WO | 2018/025582 | 2/2018 |
| WO | 2019/135328 | 7/2019 |
| WO | 2019/135344 | 7/2019 |

OTHER PUBLICATIONS

EPC Office Action issued in EP Patent Application No. 21780196.8, Aug. 29, 2023.

\* cited by examiner

METHOD FOR PRODUCING HALIDE

BACKGROUND

1. Technical Field

The present disclosure relates to a method for producing a halide.

2. Description of the Related Art

International Publication No. WO2018/025582 discloses a method for producing a halide solid electrolyte.

SUMMARY

One non-limiting and exemplary embodiment provides a halide production method with high industrial productivity.

In one general aspect, the techniques disclosed here feature a method for producing a halide, the method including heat-treating a material mixture containing a compound containing Y, a compound containing Sm, $NH_4\alpha$, $Li\beta$, and $Ca\gamma_2$ in an inert gas atmosphere. The compound containing Y is at least one selected from the group consisting of $Y_2O_3$ and $Y\delta_3$, and the compound containing Sm is at least one selected from the group consisting of $Sm_2O_3$ and $Sm\varepsilon_3$. The material mixture contains at least one selected from the group consisting of $Y_2O_3$ and $Sm_2O_3$, and $\alpha$, $\beta$, $\gamma$, $\delta$, and $\varepsilon$ are each independently at least one selected from the group consisting of F, Cl, Br, and I.

The present disclosure provides a halide production method with high industrial productivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Embodiments will next be described with reference to the drawings.

First Embodiment

Figure 1:
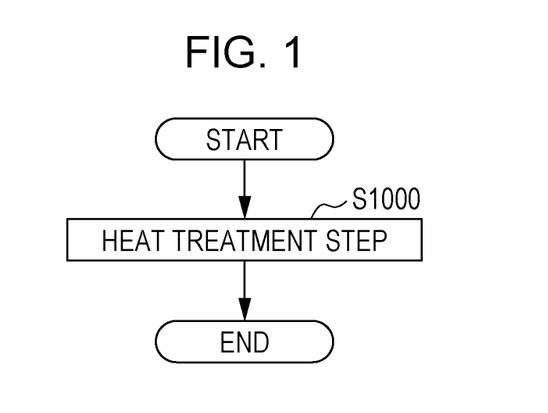
FIG. 1 is a flowchart showing an example of a production method in a first embodiment.

FIG. 1 is a flowchart showing an example of a production method in a first embodiment.

The production method in the first embodiment includes a heat treatment step S1000. In the heat treatment step S1000, a material mixture is heat-treated in an inert gas atmosphere.

The material mixture heat-treated in the heat treatment step S1000 contains a compound containing Y, a compound containing Sm, $NH_4\alpha$, $Li\beta$, and $Ca\gamma_2$. The compound containing Y is at least one selected from the group consisting of $Y_2O_3$ and $Y\delta_3$. The compound containing Sm is at least one selected from the group consisting of $Sm_2O_3$ and $Sm\varepsilon_3$. The material mixture contains at least one selected from the group consisting of $Y_2O_3$ and $Sm_2O_3$. $\alpha$, $\beta$, $\gamma$, $\delta$, and $\varepsilon$ are each independently at least one selected from the group consisting of F, Cl, Br, and I.

The production method in the first embodiment is a halide production method with high industrial productivity. The method with high industrial productivity is, for example, a method capable of mass production at low cost. Specifically, this production method allows a halide containing Li (i.e., lithium), Y (i.e., yttrium), Sm (i.e., samarium), and Ca (i.e., calcium) to be produced in a simple manner (i.e., by sintering in an inert gas atmosphere).

The compound containing Y and the compound containing Sm will be hereinafter referred to as an Y-containing compound and a Sm-containing compound, respectively.

In the production method in the first embodiment, a vacuum sealed tube and a planetary ball mill may not be used.

The material mixture may contain $Y_2O_3$, $Sm_2O_3$, $NH_4\alpha$, $Li\beta$, and $Ca\gamma_2$. $Y_2O_3$, $Sm_2O_3$, $NH_4\alpha$, $Li\beta$, and $Ca\gamma_2$ contained in the material mixture are inexpensive, so that the production cost can be reduced.

To further improve the ionic conductivity of the halide, $\alpha$, $\beta$, $\gamma$, $\delta$, and $\varepsilon$ may each independently be at least one selected from the group consisting of Cl and Br.

For example, when $Y_2O_3$, $Sm_2O_3$, $NH_4\alpha$, $Li\alpha$ (i.e., $\beta$ in $Li\beta$ is $\alpha$), and $Ca\alpha_2$ (i.e., $\gamma$ in $Ca\gamma_2$ is $\alpha$) are used to produce $Li_{2.8}Ca_{0.1}Y_{0.8}Sm_{0.2}\alpha_6$, the reaction represented by the following formula (1) may proceed in the system as a whole.

$$0.8Y_2O_3 + 0.2Sm_2O_3 + 12NH_4\alpha + 6Li\alpha + 0.2Ca\alpha_2 \rightarrow 2Li_{2.8}Ca_{0.1}Y_{0.8}Sm_{0.2}\alpha_6 + 12NH_3 + 6H\alpha + 3H_2O \quad (1)$$

In the heat treatment step S1000, for example, the powder of the material mixture may be placed in a container (e.g., a crucible) and heat-treated in a heating furnace. In this case, the material mixture heated to a prescribed temperature in the inert gas atmosphere may be held at the prescribed temperature for a prescribed time period or more. The heat treatment time period may be the length of time that does not cause a change in the composition of the heat-treated product due to volatilization of the halide etc. The length of time that does not cause a change in the composition of the heat-treated product means a heat treatment time period that does not cause deterioration of the ionic conductivity of the heat-treated product. With the production method in the first embodiment, a halide having, for example, an ionic conductivity higher than or equal to $6.0 \times 10^{-10}$ S/cm at around room temperature can be produced.

The inert gas atmosphere means, for example, an atmosphere in which the total concentration of gases other than the inert gas is lower than or equal to 1% by volume. Examples of the inert gas include helium, nitrogen, and argon.

After the heat treatment step S1000, the heat-treated product may be pulverized. In this case, a pulverizing apparatus (such as a mortar or a mixer) may be used.

Part of metal cations in at least one selected from the group consisting of the Y-containing compound and the Sm-containing compound that are contained in the material mixture may be replaced with other metal cations. Specifically, part of Y and Sm may be replaced with other metal cations. In other words, the material mixture may further contain an Y-containing compound with part of Y replaced with other metal cations or a Sm-containing compound with part of Sm replaced with other metal cations. In this case, the characteristics (e.g., ionic conductivity) of the halide produced can be improved. The rate of replacement of Y and Sm with other metal cations may be less than 50 mol %. In this case, the halide obtained has a more stable structure.

Part of metal cations in at least one selected from the group consisting of Liβ and Caγ₂ that are contained in the material mixture may be replaced with other metal cations. Specifically, part of Li and Ca may be replaced with other metal cations. Therefore, the material mixture may further contain a compound containing Liβ with part of Li replaced with other metal cations or a compound containing Caγ₂ with part of Ca replaced with other metal cations. In this case, the characteristics (e.g., ionic conductivity) of the halide produced can be improved. The rate of replacement of Li and Ca with other metal cations may be less than 50 mol %. In this case, the halide obtained has a more stable structure.

Part of metal cations in at least one selected from the group consisting of the Y-containing compound and the Sm-containing compound that are contained in the material mixture may be replaced with, for example, at least one type of cations selected from the group consisting of Na, K, Mg, Sr, Ba, Zn, In, Sn, Bi, La, Ce, Pr, Nd, Pm, Sm, Eu, Tb, Dy, Ho, Er, Tm, Yb, and Lu.

The material mixture may be a material prepared by mixing the Y-containing compound, the Sm-containing compound, NH₄α, Liβ, and Caγ₂. Specifically, the material mixture may be composed of the Y-containing compound, the Sm-containing compound, NH₄α, Liβ, and Caγ₂.

The material mixture may contain not only the Y-containing compound, the Sm-containing compound, NH₄α, Liβ, and Caγ₂ but also a material different from the Y-containing compound, the Sm-containing compound, NH₄α, Liβ, and Caγ₂.

In the heat treatment step S1000, the material mixture may be heat-treated at higher than or equal to 350° C. Here, the heat treatment temperature is an ambient temperature. In this case, the industrial productivity of the method is high, and the halide produced thereby can have high ionic conductivity. When the heat treatment temperature is higher than or equal to 350° C., the reaction of the material mixture can proceed sufficiently. Specifically, the Y-containing compound, the Sm-containing compound, NH₄α, Liβ, and Caγ₂ can be allowed to react sufficiently. When the material mixture is heat-treated at higher than or equal to 350° C., the halide produced can have, for example, an ionic conductivity higher than or equal to $1.0 \times 10^{-4}$ S/cm at around room temperature.

In the heat treatment step S1000, the material mixture may be heat-treated at lower than or equal to 650° C. The material mixture may be heat-treated at, for example, higher than or equal to 350° C. and lower than or equal to 650° C. In this case, the industrial productivity of the method is high, and the halide produced thereby can have high ionic conductivity. When the heat treatment temperature is lower than or equal to 650° C., the halide formed by the solid phase reaction can be prevented from undergoing thermal decomposition.

In formula (1) above, $Y_2O_3$, $Sm_2O_3$, and NH₄α may be first reacted with each other, and then $Y_2O_3$ and $Sm_2O_3$ may be halogenated. Next, a heat treatment profile may be set such that the halogenated $Y_2O_3$ and $Sm_2O_3$ are reacted with Liβ and Caγ₂. In this case, the heat treatment temperature may be a temperature that is lower than the sublimation point or melting point of NH₄α and allows the halogenated $Y_2O_3$ and $Sm_2O_3$ to react with Liβ and Caγ₂. Specifically, the heat treatment temperature may be a temperature that is lower than the sublimation point or melting point of NH₄α and allows the halide solid electrolyte material to be formed.

For example, when $Li_{2.8}Ca_{0.1}Y_{0.8}Sm_{0.2}Cl_6$ is synthesized from $Y_2O_3$, $Sm_2O_3$, NH₄Cl, LiCl, and $CaCl_2$, the reaction represented by formula (2) below may proceed.

$$0.8Y_2O_3 + 0.2Sm_2O_3 + 12NH_4Cl + 5.6LiCl + 0.2CaCl_2 \rightarrow 2Li_{2.8}Ca_{0.1}Y_{0.8}Sm_{0.2}Cl_6 + 12NH_3 + 6HCl + 3H_2O \quad (2)$$

The heat treatment temperature in this reaction may be set to about 300° C. Specifically, the heat treatment temperature may be set to a temperature that is lower than about 335° C., which is the sublimation point of NH₄Cl, and allows the halide solid electrolyte material to be formed. To produce a halide having higher ionic conductivity, the heat treatment temperature may be higher than or equal to 350° C. In this case, as shown in a second embodiment described later, the heat treatment step may include two or more sub-steps. In this case, the heat treatment temperature in the first sub-step in the heat treatment step may be set to a temperature lower than the sublimation point of NH₄α, and the heat treatment temperature in the second and later sub-steps in the heat treatment step may be set to a higher temperature.

In the heat treatment step S1000, the material mixture may be heat-treated in more than or equal to 1 hour and less than or equal to 72 hours. In this case, the industrial productivity of the method is high, and the halide produced thereby can have high ionic conductivity. When the heat treatment time period is more than or equal to 1 hour, the reaction of the material mixture can proceed sufficiently. Specifically, the Y-containing compound, the Sm-containing compound, NH₄α, Liβ, and Caγ₂ can be allowed to react sufficiently. When the heat treatment time period is less than or equal to 72 hours, the halide, which is the heat-treated product, can be prevented from volatilizing. Specifically, the halide obtained has the target composition. Therefore, a reduction in the ionic conductivity of the halide due to a change in the composition can be prevented. Specifically, the halide solid electrolyte material obtained can have better quality.

Figure 2:
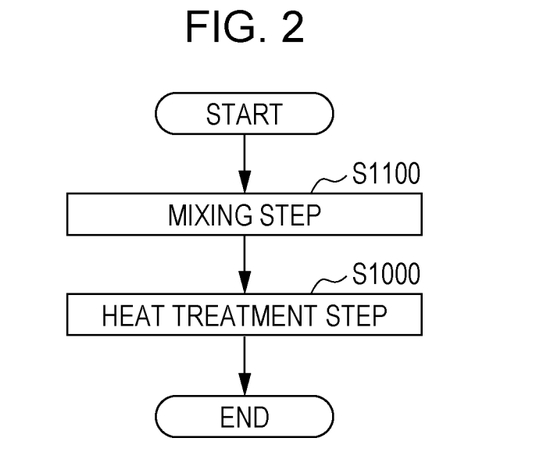
FIG. 2 is a flowchart showing an example of the production method in the first embodiment.

FIG. 2 is a flowchart showing an example of the production method in the first embodiment.

As shown in FIG. 2, the production method in the first embodiment may further include a mixing step S1100.

The mixing step S1100 is performed before the heat treatment step S1000.

In the mixing step S1100, the Y-containing compound, the Sm-containing compound, NH₄α, Liβ, and Caγ₂ used as the raw materials are mixed. A material mixture is thereby obtained. Specifically, the material to be heat-treated in the heat treatment step S1000 is obtained.

To mix the raw materials, a well-known mixer (such as a mortar, a blender, or a ball mill) may be used.

For example, in the mixing step S1100, powders of the raw materials may be prepared and mixed. In this case, in the heat treatment step S1000, the material mixture in a powder form may be heat-treated. The powdery material mixture obtained in the mixing step S1100 may be pressed and formed into pellets. In the heat treatment step S1000, the material mixture in the form of pellets may be heat-treated.

In the mixing step S1100, the Y-containing compound, the Sm-containing compound, $NH_4\alpha$, $Li\beta$, and $Ca\gamma_2$ are mixed, and a material other than the Y-containing compound, the Sm-containing compound, $NH_4\alpha$, $Li\beta$, and $Ca\gamma_2$ may be further mixed to obtain a material mixture.

In the mixing step S1100, a raw material containing the Y-containing compound as a main component, a raw material containing the Sm-containing compound as a main component, a raw material containing $NH_4\alpha$ as a main component, a raw material containing $Li\beta$ as a main component, and a raw material containing $Ca\gamma_2$ as a main component may be mixed. The main component is a component whose molar ratio is highest.

In the mixing step S1100, the Y-containing compound, the Sm-containing compound, $NH_4\alpha$, $Li\beta$, and $Ca\gamma_2$ may be prepared such that the target composition is satisfied and then mixed.

When $Y_2O_3$ and $Sm_2O_3$ are used as the Y-containing compound and the Sm-containing compound, respectively, $Y_2O_3$, $Sm_2O_3$, $NH_4Cl$, $LiCl$, and $CaCl_2$ may be mixed such that, for example, the molar ratio $Y_2O_3:Sm_2O_3:NH_4Cl:LiCl:CaCl_2=0.25:0.25:6:2.8:0.1$. In this case, a halide having a composition represented by $Li_{2.8}Ca_{0.1}Y_{0.5}Sm_{0.5}Cl_6$ can be produced.

The molar ratio of the Y-containing compound, the Sm-containing compound, $NH_4\alpha$, $Li\beta$, and $Ca\gamma_2$ may be adjusted in advance so as to compensate for the change in the composition that may occur in the heat treatment step S1000.

To allow the synthesis reaction in the heat treatment step S1000 to proceed preferably, the amount of $NH_4\alpha$ prepared may be in excess of the total amount of $Y_2O_3$ and $Sm_2O_3$. For example, the amount of $NH_4\alpha$ prepared is larger by 5 to 15 mol % than the total amount of $Y_2O_3$ and $Sm_2O_3$.

In the mixing step S1100, part of metal cations in at least one selected from the group consisting of the Y-containing compound and Sm-containing compound may be replaced with other metal cations. Specifically, part of Y and Sm may be replaced with other metal cations. In other words, an Y-containing compound with part of Y replaced with other metal cations or a Sm-containing compound with part of Sm replaced with other metal cations may be further mixed to obtain a material mixture. The rate of replacement of Y and Sm with other metal cations may be less than 50 mol %.

Figure 3:
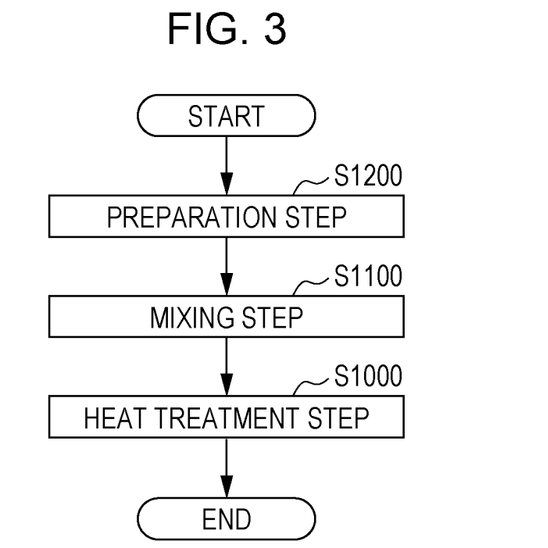
FIG. 3 is a flowchart showing an example of the production method in the first embodiment.

FIG. 3 is a flowchart showing an example of the production method in the first embodiment.

As shown in FIG. 3, the production method in the first embodiment may further include a preparation step S1200.

The preparation step S1200 is performed before the mixing step S1100.

In the preparation step S1200, raw materials such as the Y-containing compound, the Sm-containing compound, $NH_4\alpha$, $Li\beta$, and $Ca\gamma_2$ are prepared. Specifically, the materials to be mixed in the mixing step S1100 are prepared.

In the preparation step S1200, the raw materials such as the Y-containing compound, the Sm-containing compound, $NH_4\alpha$, $Li\beta$, and $Ca\gamma_2$ may be synthesized. Alternatively, in the preparation step S1200, for example, materials with a purity higher than or equal to 99% may be used.

The materials prepared may be dried.

Examples of the form of each of the materials prepared include a crystalline form, a lump form, a flake form, and a powder form. In the preparation step S1200, crystalline, lump-like, or flake-like raw materials may be pulverized to obtain powdery raw materials.

In the preparation step S1200, part of metal cations in at least one selected from the group consisting of the Y-containing compound and the Sm-containing compound may be replaced with other metal cations. Specifically, part of Y and Sm may be replaced with other metal cations. In other words, an Y-containing compound with part of Y replaced with other metal cations or a Sm-containing compound with part of Sm replaced with other metal cations may be further prepared. The rate of replacement of Y and Sm with other metal cations may be less than 50 mol %.

The halide produced by the production method in the first embodiment can be used as a solid electrolyte material. This solid electrolyte material is, for example, a solid electrolyte material having lithium ion conductivity. This solid electrolyte material is used, for example, for an all-solid-state lithium ion secondary battery.

Second Embodiment

A second embodiment will next be described. Features already described in the first embodiment will be omitted appropriately.

Figure 4:
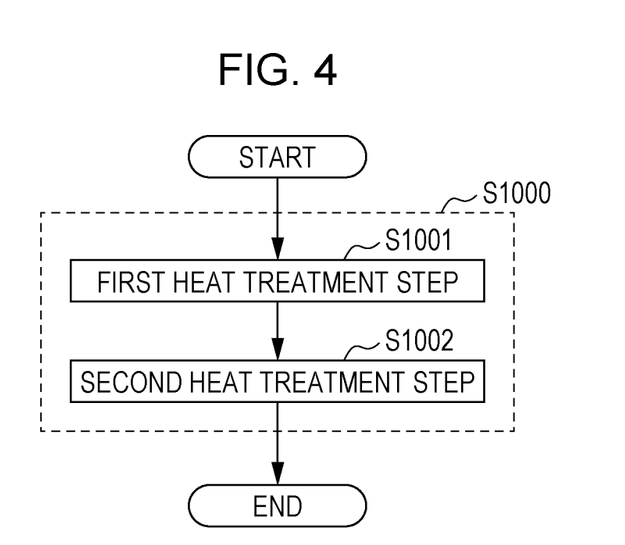
FIG. 4 is a flowchart showing an example of a production method in a second embodiment.

FIG. 4 is a flowchart showing an example of a production method in the second embodiment.

In the production method in the second embodiment, a heat treatment step S1000 includes a first heat treatment step S1001 and a second heat treatment step S1002. The second heat treatment step S1002 is performed after the first heat treatment step S1001.

In the first heat treatment step S1001, the material mixture is heat-treated at first heat treatment temperature T1. In the second heat treatment step S1002, the material mixture is heat-treated at second heat treatment temperature T2. The second heat treatment temperature T2 is higher than or equal to 350° C. and is higher than the first heat treatment temperature T1.

The production method in the second embodiment is a highly industrially productive method for producing a halide having higher ionic conductivity.

The production method in the second embodiment will next be described using an example in which the material mixture contains $Y_2O_3$ and $Sm_2O_3$.

In the first heat treatment step S1001, $Y_2O_3$, $Sm_2O_3$, and $NH_4\alpha$ are reacted with each other at the first heat treatment temperature T1. Specifically, $Y_2O_3$ and $Sm_2O_3$ are halogenated. In the second heat treatment step S1002, the halogenated $Y_2O_3$ and $Sm_2O_3$ are reacted with $Li\beta$ and $Ca\gamma_2$ at the second heat treatment temperature T2. In this case, the halide, which is the heat-treated product, has higher crystallinity. Therefore, the ionic conductivity of the halide that is the heat-treated product can be increased. Specifically, the halide solid electrolyte material obtained has high quality.

To produce a halide having higher ionic conductivity using the highly industrially productive method, the first heat treatment temperature T1 may be higher than or equal to 160° C. and lower than 350° C. When the first heat treatment temperature T1 is higher than or equal to 160° C., $Y_2O_3$, $Sm_2O_3$, and $NH_4\alpha$ can be allowed to react sufficiently. When the first heat treatment temperature T1 is lower than 350° C., the sublimation of $NH_4\alpha$ can be prevented. In this manner, the ionic conductivity of the halide, which is the heat-treated product, can be increased. Specifically, the halide solid electrolyte material obtained has high quality.

To produce a halide with higher ionic conductivity using the highly industrially productive method, the second heat treatment temperature T2 may be higher than or equal to 350° C. and lower than or equal to 650° C. When the second heat treatment temperature T2 is higher than or equal to 350° C., the reaction of the material mixture can proceed sufficiently. Specifically, the Y-containing compound, the Sm-containing compound, $NH_4\alpha$, $Li\beta$, and $Ca\gamma_2$ can be allowed to react sufficiently. In this case, the halide, which is the heat-treated product, has higher crystallinity. When the second heat treatment temperature T2 is lower than or equal to 650° C., the halide formed by the solid phase reaction can be prevented from undergoing thermal decomposition. In this case, the ionic conductivity of the halide that is the heat-treated product can be increased. Specifically, the halide solid electrolyte material obtained has high quality.

Figure 5:
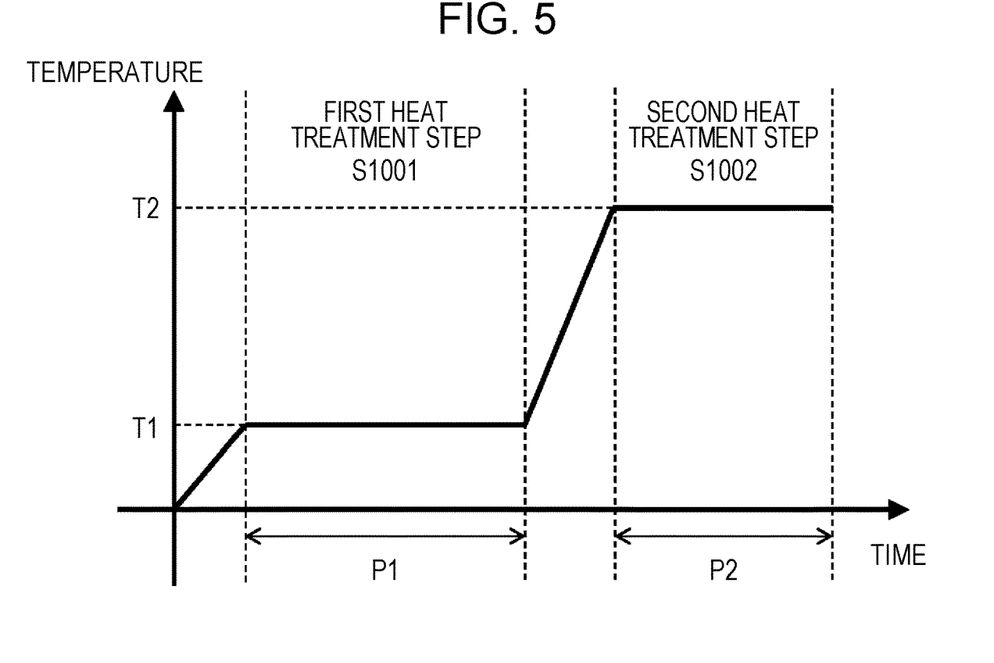
FIG. 5 is a graph showing an example of a heat treatment temperature profile in the production method in the second embodiment.

FIG. 5 is a graph showing an example of a heat treatment temperature profile in the production method in the second embodiment.

As shown in FIG. 5, in the first heat treatment step S1001, the material mixture may be heat-treated for a first heat treatment time period P1. In the second heat treatment step S1002, the material mixture may be heat-treated for a second heat treatment time period P2.

To produce a halide with higher ionic conductivity using the highly industrially productive method, the first heat treatment time period P1 may be more than or equal to 1 hour and less than or equal to 72 hours. When the first heat treatment time period P1 is more than or equal to 1 hour, $Y_2O_3$, $Sm_2O_3$, and $NH_4\alpha$ can be allowed to react sufficiently. When the first heat treatment time period P1 is less than or equal to 72 hours, the "reaction product of $Y_2O_3$ and $NH_4\alpha$" and the "reaction product of $Sm_2O_3$ and $NH_4\alpha$" can be prevented from volatilizing. Specifically, the halide obtained has the target composition. Therefore, a reduction in the ionic conductivity of the halide due to a change in the composition can be prevented. Specifically, the halide solid electrolyte material obtained has higher quality.

To produce a halide with higher ionic conductivity using the highly industrially productive method, the second heat treatment time period P2 may be more than or equal to 1 hour and less than or equal to 72 hours. When the second heat treatment time period P2 is more than or equal to 1 hour, the reaction of the material mixture can proceed sufficiently. Specifically, the Y-containing compound, the Sm-containing compound, $NH_4\alpha$, $Li\beta$, and $Ca\gamma_2$ can be allowed to react sufficiently. When the second heat treatment time period P2 is less than or equal to 72 hours, the halide, which is the heat-treated product, can be prevented from volatilizing. Specifically, the halide obtained has the target composition. Therefore, a reduction in the ionic conductivity of the halide due to a change in the composition can be prevented. Specifically, the halide solid electrolyte material obtained has higher quality.

P1>P2 may be satisfied. Specifically, the first heat treatment time period P1 may be more than the second heat treatment time period P2. In this case, the halide produced using the highly industrially productive method can have higher ionic conductivity.

In the first heat treatment step S1001, $Y_2O_3$, $Sm_2O_3$, and $NH_4\alpha$ can be allowed to react sufficiently at the first heat treatment temperature T1 for the first heat treatment time period P1. Specifically, $Y_2O_3$ and $Sm_2O_3$ can be halogenated sufficiently. Next, in the second heat treatment step S1002, the sufficiently halogenated $Y_2O_3$ and $Sm_2O_3$ are reacted with $Li\beta$ and $Ca\gamma_2$ at the second heat treatment temperature T2 for the second heat treatment time period P2. In this case, the halide, which is the heat-treated product, has higher crystallinity. Therefore, the halide that is the heat-treated product can have higher ionic conductivity. Specifically, the halide solid electrolyte material obtained has high quality.

In the first heat treatment step S1001, $(NH_4)_aY\alpha_{3+a}$ (0≤a≤3) may be synthesized from $Y_2O_3$ and $NH_4\alpha$. $(NH_4)_bSm\alpha_{3+b}$ (0≤b≤3) may be synthesized from $Sm_2O_3$ and $NH_4\alpha$.

In the second heat treatment step S1002, the $(NH_4)_aY\alpha_{3+a}$ and $(NH_4)_bSm\alpha_{3+b}$ produced in the first heat treatment step S1001 may be reacted with $Li\beta$ and $Ca\gamma_2$ to thereby obtain a halide (i.e., a solid electrolyte material).

Suppose, for example, that $Y_2O_3$, $Sm_2O_3$, $NH_4Cl$, LiCl, and $CaCl_2$ are used to synthesize $Li_{2.8}Ca_{0.1}Y_{0.8}Sm_{0.2}Cl_6$. The first heat treatment temperature T1 is about 200° C., and the second heat treatment temperature T2 is about 500° C. In this case, $NH_4Cl$ is reacted with $Y_2O_3$ and $Sm_2O_3$ without sublimation in the first heat treatment step S1001, and $(NH_4)_aY\alpha_{3+a}$ (0≤a≤3) and $(NH_4)_bSm\alpha_{3+b}$ (0≤b≤3) are mainly produced. Next, in the second heat treatment step S1002, $(NH_4)_aY\alpha_{3+a}$ and $(NH_4)_bSm\alpha_{3+b}$ are reacted with LiCl and $CaCl_2$, and a halide solid electrolyte material having high crystallinity is thereby obtained. The halide solid electrolyte material obtained in the manner described above has high ionic conductivity.

The heat treatment step S1000 may include, in addition to the first heat treatment step S1001 and the second heat treatment step S1002, an additional heat treatment step. Specifically, the heat treatment step S1000 may include three or more sub-steps depending on the types of raw materials or the number of raw materials.

EXAMPLES

The present disclosure will next be described in more detail.

In the following samples, halides produced by the production method of the present disclosure were evaluated as solid electrolyte materials.

<Sample 1>

(Production of Solid Electrolyte Material)

In an argon atmosphere with a dew point lower than or equal to −60° C. and an oxygen concentration lower than or equal to 0.0001% by volume (this atmosphere is hereinafter referred to as a "dry argon atmosphere"), powders of $Y_2O_3$, $Sm_2O_3$, $NH_4Cl$, LiCl, LiBr, and $CaBr_2$ were prepared as raw material powders such that the molar ratio $Y_2O_3$:$Sm_2O_3$:$NH_4Cl$:liCl:LiBr:$CaBr_2$=0.4:0.1:6.6:0.5:2.3:0.1. These materials were pulverized in an agate mortar and mixed. The mixture obtained was placed in an alumina crucible and heat-treated in a nitrogen atmosphere at 500° C. for 1 hour. Specifically, the heat treatment temperatures T1 and T2 were both 500° C. The heat-treated product obtained was pulverized in an agate mortar. A solid electrolyte material in sample 1 was thereby obtained.

(Evaluation of Ionic Conductivity)

Figure 6:
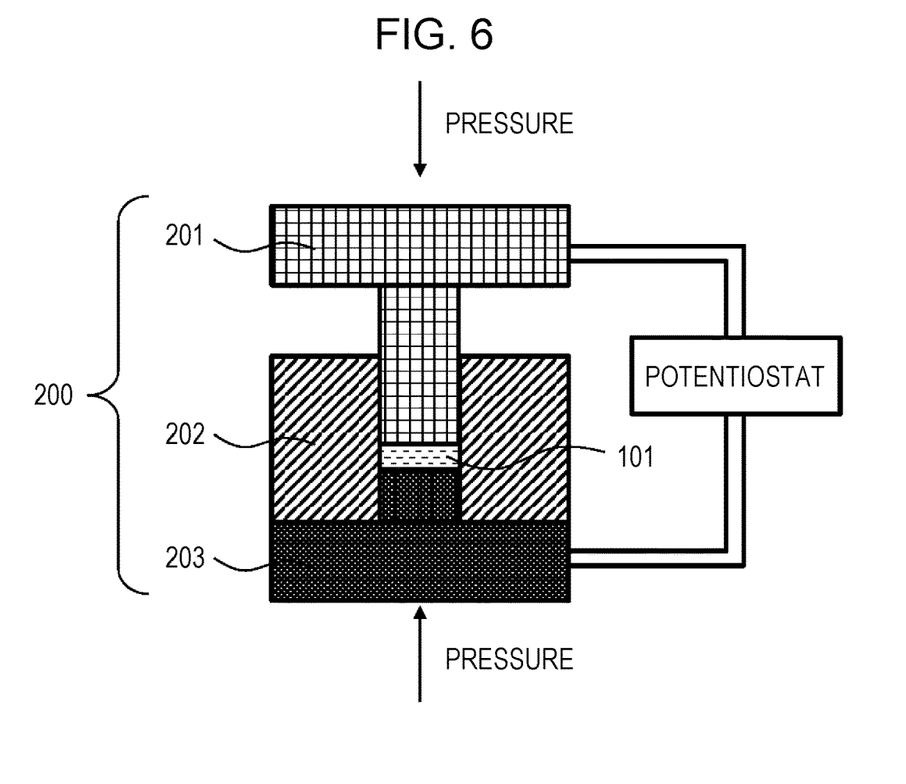
FIG. 6 is a schematic illustration of a press forming die 200 used to evaluate the ionic conductivity of a solid electrolyte material.

FIG. 6 is a schematic illustration of a press forming die 200 used to evaluate the ionic conductivity of the solid electrolyte material.

The press forming die 200 includes an upper punch 201, a frame die 202, and a lower punch 203. The frame die 202 is formed of insulating polycarbonate. The upper punch 201 and the lower punch 203 are formed of electron conductive stainless steel.

The press forming die 200 shown in FIG. 6 was used to measure the impedance of the solid electrolyte material in sample 1 using the following method.

The solid electrolyte material powder in sample 1 was filled into the press forming die 200 in a dry atmosphere with a dew point lower than or equal to −60° C. The upper punch 201 and the lower punch 203 were used to apply a pressure of 300 MPa to the solid electrolyte material in sample 1 disposed inside the press forming die 200.

With the pressure applied, the upper punch 201 and the lower punch 203 were connected to a potentiostat (VersaS-TAT 4, Princeton Applied Research) equipped with a frequency response analyzer. The upper punch 201 was connected to a working electrode and a potential measurement terminal. The lower punch 203 was connected to a counter electrode and a reference electrode. The impedance of the solid electrolyte material was measured at room temperature using an electrochemical impedance measurement method.

Figure 7:
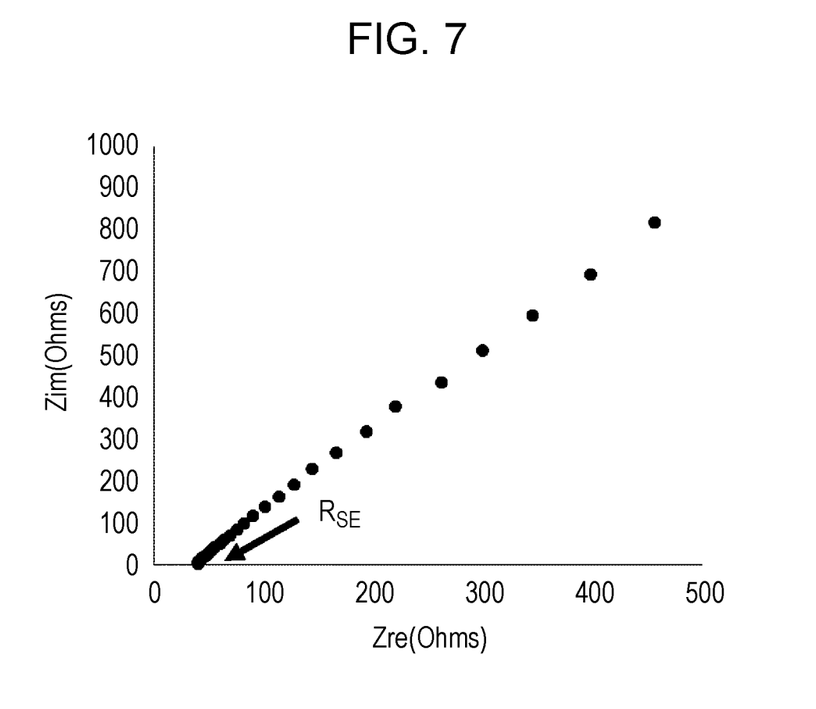
FIG. 7 is a graph showing a Cole-Cole plot obtained by the measurement of the impedance of a solid electrolyte material in sample 1.

FIG. 7 is a graph showing a Cole-Cole plot obtained by the measurement of the impedance of the solid electrolyte material in sample 1.

In FIG. 7, the real value of the complex impedance at a measurement point at which the absolute value of the phase of the complex impedance was minimum was regarded as the ionic conduction resistance of the solid electrolyte material. See an arrow $R_{SE}$ shown in FIG. 7 for this real value. This resistance value was used to compute the ionic conductivity from the following formula (3).

$$\sigma = (R_{SE} \times S/t)^{-1} \quad (3)$$

Here, σ represents the ionic conductivity. S represents the area of contact between the solid electrolyte material and the upper punch 201 (that is equal to the cross-sectional area of a hollow portion of the frame die 202 in FIG. 6). $R_{SE}$ represents the resistance value of the solid electrolyte material in the impedance measurement. t represents the thickness of the solid electrolyte material (the thickness of a layer formed of the solid electrolyte material powder 101 in FIG. 6).

The ionic conductivity of the solid electrolyte material in sample 1 was $1.6 \times 10^{-3}$ S/cm as measured at 25° C.

<Samples 2 to 16>
(Production of Solid Electrolyte Materials)

For samples 2 and 3, the same procedure as in sample 1 was repeated except that the heat treatment temperature was changed, and solid electrolyte materials in samples 2 and 3 were thereby obtained. The heat treatment temperatures are shown in Table 1.

For samples 4 to 11, instead of the heat treatment at 500° C. for 1 hour in sample 1, two-stage heat treatment was performed. The mixture of the raw materials was heat-treated at temperature T1 for 15 hours and then heat-treated at temperature T2 for 1 hour. Solid electrolyte materials in samples 4 to 11 were obtained using the same procedure as in sample 1 except for the above operation. The temperatures T1 and T2 are shown in Table 1.

For sample 12, powders of $Y_2O_3$, $Sm_2O_3$, $NH_4Br$, LiBr, and $CaCl_2$ were prepared as raw material powders in the dry argon atmosphere such that the molar ratio $Y_2O_3$:$Sm_2O_3$:$NH_4Br$:LiBr:$CaCl_2$=0.4:0.1:6.6:2.8:0.1. A solid electrolyte material in sample 12 was obtained using the same procedure as in sample 4 except for the above operation.

For sample 13, powders of $Y_2O_3$, $SmCl_3$, $NH_4Cl$, LiCl, LiBr, and $CaBr_2$ were prepared as raw material powders in the dry argon atmosphere such that the molar ratio $Y_2O_3$:$SmCl_3$:$NH_4Cl$:LiCl:LiBr:$CaBr_2$=0.4:0.1:3.3:0.5:2.3:0.1. A solid electrolyte material in sample 13 was obtained using the same procedure as in sample 4 except for the above operation.

For sample 14, powders of $YCl_3$, $Sm_2O_3$, $NH_4Cl$, LiCl, LiBr, and $CaBr_2$ were prepared as raw material powders in the dry argon atmosphere such that the molar ratio $YCl_3$:$Sm_2O$:$NH_4Cl$:LiCl:LiBr:$CaBr_2$=0.4:0.1:3.3:0.5:2.3:0.1. A solid electrolyte material in sample 14 was obtained using the same procedure as in sample 4 except for the above operation.

For sample 15, a solid electrolyte material in sample 15 was obtained using the same procedure as in sample 4 except that the temperature T2 was changed. The temperature T2 is shown in Table 1.

For sample 16, a solid electrolyte material in sample 16 was obtained using the same procedure as in sample 1 except that the heat treatment temperature was changed. The heat treatment temperature is shown in Table 1.

(Evaluation of Ionic Conductivity)

The ionic conductivity of each of the solid electrolyte materials in samples 2 to 16 was measured in the same manner as in sample 1. The measurement results are shown in Table 1.

In Table 1, raw material 1 is an oxide or halide containing Y. Raw material 2 is an oxide or halide containing Sm. Raw material 3 is ammonium halide. Raw material 4 is LiCl. Raw material 5 is LiBr. Raw material 6 is a halide containing Ca.

TABLE 1

| | Raw material 1 | Raw material 2 | Raw material 3 $NH_4\alpha$ | Raw material 6 $Ca\gamma_2$ | Molar mixing ratio Raw material 1:raw material 2: raw material 3: raw material 4: raw material 5: raw material 6 | Heat treatment temperature T1 (° C.) | T2 (° C.) | Ionic conductivity (S/cm) |
|---|---|---|---|---|---|---|---|---|
| Sample 1 | $Y_2O_3$ | $Sm_2O_3$ | $NH_4Cl$ | $CaBr_2$ | 0.4:0.1:6.6:0.5:2.3:0.1 | | 500 | $1.6 \times 10^{-3}$ |
| Sample 2 | $Y_2O_3$ | $Sm_2O_3$ | $NH_4Cl$ | $CaBr_2$ | 0.4:0.1:6.6:0.5:2.3:0.1 | | 350 | $2.6 \times 10^{-4}$ |
| Sample 3 | $Y_2O_3$ | $Sm_2O_3$ | $NH_4Cl$ | $CaBr_2$ | 0.4:0.1:6.6:0.5:2.3:0.1 | | 650 | $1.7 \times 10^{-3}$ |
| Sample 4 | $Y_2O_3$ | $Sm_2O_3$ | $NH_4Cl$ | $CaBr_2$ | 0.4:0.1:6.6:0.5:2.3:0.1 | 200 | 500 | $2.9 \times 10^{-3}$ |
| Sample 5 | $Y_2O_3$ | $Sm_2O_3$ | $NH_4Cl$ | $CaBr_2$ | 0.4:0.1:6.6:0.5:2.3:0.1 | 200 | 350 | $3.9 \times 10^{-4}$ |
| Sample 6 | $Y_2O_3$ | $Sm_2O_3$ | $NH_4Cl$ | $CaBr_2$ | 0.4:0.1:6.6:0.5:2.3:0.1 | 200 | 400 | $5.5 \times 10^{-4}$ |
| Sample 7 | $Y_2O_3$ | $Sm_2O_3$ | $NH_4Cl$ | $CaBr_2$ | 0.4:0.1:6.6:0.5:2.3:0.1 | 200 | 650 | $1.6 \times 10^{-3}$ |
| Sample 8 | $Y_2O_3$ | $Sm_2O_3$ | $NH_4Cl$ | $CaBr_2$ | 0.4:0.1:6.6:0.5:2.3:0.1 | 160 | 500 | $1.9 \times 10^{-3}$ |
| Sample 9 | $Y_2O_3$ | $Sm_2O_3$ | $NH_4Cl$ | $CaBr_2$ | 0.4:0.1:6.6:0.5:2.3:0.1 | 180 | 500 | $2.9 \times 10^{-3}$ |
| Sample 10 | $Y_2O_3$ | $Sm_2O_3$ | $NH_4Cl$ | $CaBr_2$ | 0.4:0.1:6.6:0.5:2.3:0.1 | 240 | 500 | $3.2 \times 10^{-3}$ |
| Sample 11 | $Y_2O_3$ | $Sm_2O_3$ | $NH_4Cl$ | $CaBr_2$ | 0.4:0.1:6.6:0.5:2.3:0.1 | 350 | 500 | $2.6 \times 10^{-3}$ |
| Sample 12 | $Y_2O_3$ | $Sm_2O_3$ | $NH_4Br$ | $CaCl_2$ | 0.4:0.1:6.6:0:2.8:0.1 | 200 | 500 | $1.5 \times 10^{-4}$ |
| Sample 13 | $Y_2O_3$ | $SmCl_3$ | $NH_4Cl$ | $CaBr_2$ | 0.4:0.1:3.3:0.5:2.3:0.1 | 200 | 500 | $7.6 \times 10^{-4}$ |
| Sample 14 | $YCl_3$ | $Sm_2O_3$ | $NH_4Cl$ | $CaBr_2$ | 0.4:0.1:3.3:0.5:2.3:0.1 | 200 | 500 | $5.3 \times 10^{-4}$ |

TABLE 1-continued

| | Raw material 1 | Raw material 2 | Raw material 3 NH$_4\alpha$ | Raw material 6 Ca$\gamma_2$ | Molar mixing ratio Raw material 1:raw material 2: raw material 3: raw material 4: raw material 5: raw material 6 | Heat treatment temperature T1 (° C.) | Heat treatment temperature T2 (° C.) | Ionic conductivity (S/cm) |
|---|---|---|---|---|---|---|---|---|
| Sample 15 | Y$_2$O$_3$ | Sm$_2$O$_3$ | NH$_4$Cl | CaBr$_2$ | 0.4:0.1:6.6:0.5:2.3:0.1 | 200 | 300 | 6.0 × 10$^{-10}$ |
| Sample 16 | Y$_2$O$_3$ | Sm$_2$O$_3$ | NH$_4$Cl | CaBr$_2$ | 0.4:0.1:6.6:0.5:2.3:0.1 | 300 | | 7.8 × 10$^{-10}$ |

<Discussion>

As can be seen from samples 1 to 16, the solid electrolyte materials produced by the production method of the present disclosure have an ionic conductivity higher than or equal to 6.0×10$^{-10}$ S/cm at around room temperature. As can be seen from samples 1 to 14, when a step in which the heat treatment temperature is higher than or equal to 350° C. is included, the solid electrolyte material obtained has a high ionic conductivity higher than or equal to 1.0×10$^{-4}$ S/cm at around room temperature.

As can be seen by comparing sample 1 with samples 4 and 8 to 11, when the heat treatment step includes two sub-steps and T1<T2, the solid electrolyte material has higher ionic conductivity.

As can be seen by comparing sample 8 with samples 4 and 9 to 11, in the case where the heat treatment step includes two sub-steps, when the temperature T1 is higher than or equal to 180° C. and lower than or equal to 350° C., the solid electrolyte material has higher ionic conductivity.

As can be seen by comparing samples 4 and 7 with samples 5 and 6, in the case where the heat treatment step includes two sub-steps, when the temperature T2 is higher than or equal to 500° C. and lower than or equal to 650° C., the solid electrolyte material has higher ionic conductivity.

As can be seen by comparing sample 1 with samples 13 and 14, the ionic conductivity of the solid electrolyte material when the Y-containing compound and the Sm-containing compound are oxides is higher than that when the Y-containing compound and the Sm-containing compound are halides.

As described above, the halides produced by the production method of the present disclosure have high lithium ion conductivity. Moreover, the production method of the present disclosure is a simple method and is a method with high industrial productivity. The method with high industrial productivity is, for example, a method capable of mass production at low cost.

The production method of the present disclosure is used, for example, as a method for producing a solid electrolyte material. The solid electrolyte material produced by the production method of the present disclosure is used, for example, for an all-solid-state lithium ion secondary battery.

What is claimed is:

1. A method for producing a halide, the method comprising:
   heat-treating a material mixture containing a compound containing Y, a compound containing Sm, NH$_4\alpha$, Li$\beta$, and Ca$\gamma_2$ in an inert gas atmosphere,
   wherein the compound containing Y is at least one selected from the group consisting of Y$_2$O$_3$ and Y$\delta_3$,
   wherein the compound containing Sm is at least one selected from the group consisting of Sm$_2$O$_3$ and Sm$\epsilon_3$,
   wherein the material mixture contains at least one selected from the group consisting of Y$_2$O$_3$ and Sm$_2$O$_3$, and
   wherein $\alpha$, $\beta$, $\gamma$, $\delta$, and $\epsilon$ are each independently at least one selected from the group consisting of F, Cl, Br, and I.

2. The method for producing according to claim 1, wherein the material mixture contains Y$_2$O$_3$, Sm$_2$O$_3$, NH$_4\alpha$, Li$\beta$, and Ca$\gamma_2$.

3. The method for producing according to claim 1, wherein, in the heat-treating, the material mixture is heat-treated at higher than or equal to 350° C.

4. The method for producing according to claim 1, wherein, in the heat-treating, the material mixture is heat-treated at lower than or equal to 650° C.

5. The method for producing according to claim 1, wherein, in the heat-treating, the material mixture is heat-treated in more than or equal to 1 hour and less than or equal to 72 hours.

6. The method for producing according to claim 1, wherein the heat-treating includes first heat-treating and second heat-treating performed after the first heat-treating,
   wherein, in the first heat-treating, the material mixture is heat-treated at first heat treatment temperature T1,
   wherein, in the second heat-treating, the material mixture is heat-treated at second heat treatment temperature T2, and
   wherein the second heat treatment temperature T2 is higher than or equal to 350° C. and is higher than the first heat treatment temperature T1.

7. The method for producing according to claim 6, wherein the first heat treatment temperature T1 is higher than or equal to 160° C. and lower than 350° C.

8. The method for producing according to claim 6, wherein the second heat treatment temperature T2 is lower than or equal to 650° C.

9. The method for producing according to claim 6, wherein, in the first heat-treating, the material mixture is heat-treated in more than or equal to 1 hour and less than or equal to 72 hours.

10. The method for producing according to claim 6, wherein, in the second heat-treating, the material mixture is heat-treated in more than or equal to 1 hour and less than or equal to 72 hours.

11. The method for producing according to claim 6, wherein a time period for heat-treating the material mixture in the first heat-treating is more than a time period for heat-treating the material mixture in the second heat-treating.

12. The method for producing according to claim 1, wherein $\alpha$, $\beta$, $\gamma$, $\delta$, and $\epsilon$ are each independently at least one selected from the group consisting of Cl and Br.

* * * * *